United States Patent [19]

Höhne et al.

[11] Patent Number: 4,520,081
[45] Date of Patent: May 28, 1985

[54] HYDROGEN/BROMINE CELL

[75] Inventors: Karl Höhne, Erlangen; Gerd Starbeck, Nuremberg, both of Fed. Rep. of Germany

[73] Assignee: Siemens Aktiengesellschaft, Munich and Berlin, Fed. Rep. of Germany

[21] Appl. No.: 546,447

[22] Filed: Oct. 28, 1983

[30] Foreign Application Priority Data

Nov. 11, 1982 [DE] Fed. Rep. of Germany ....... 3241801

[51] Int. Cl.³ .............................................. H01M 8/18
[52] U.S. Cl. ...................................... 429/19; 429/27; 429/34; 429/105
[58] Field of Search ...................... 429/19, 20, 21, 27, 429/101, 105, 199, 34

[56] References Cited

U.S. PATENT DOCUMENTS

| 3,894,887 | 7/1975 | England | 429/203 X |
| 4,029,854 | 6/1977 | Walsh | 429/101 X |
| 4,124,741 | 11/1978 | Hart | 429/105 |
| 4,129,683 | 12/1978 | Maricle | 429/101 X |
| 4,147,601 | 4/1979 | Carlin | 204/103 |
| 4,185,145 | 1/1980 | Breault | 429/34 |
| 4,203,813 | 5/1980 | Grantham | 204/103 |
| 4,203,814 | 5/1980 | Grantham | 204/129 |
| 4,310,404 | 1/1982 | Satoh et al. | 429/34 X |
| 4,407,902 | 10/1983 | Kummer et al. | 429/34 X |

Primary Examiner—Charles F. LeFevour
Attorney, Agent, or Firm—Kenyon & Kenyon

[57] ABSTRACT

Described herein is an energy storage device which utilizes a hydrogen/bromine cell. The cell includes a bromine electrode and a hydrogen electrode. The cell is light weight, resists corrosion caused by bromine or hydrobromic acid and uses both an electrolysis and a fuel cell reaction to store or discharge electrical energy. The cell frame is made of graphite and has a pyrographite coating on at least the portion facing the bromine electrode. This cell is therefore very useful in matching varying energy supplies with varying energy demands and allows for decentralization of energy storage.

13 Claims, 1 Drawing Figure

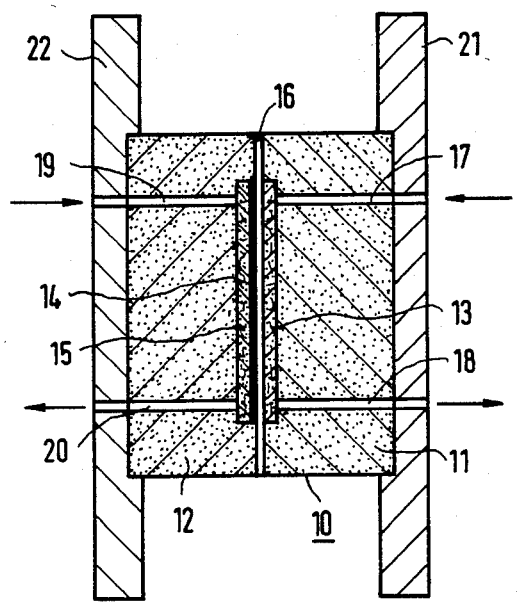

HYDROGEN/BROMINE CELL

FIELD OF THE INVENTION

The invention relates to a hydrogen/bromine cell. More specifically, it relates to the frame of this cell that surrounds the electrodes, which consists of graphite.

BACKGROUND OF THE INVENTION

Energy storage devices are needed for wide application with regenerative energy sources such as those that utilize the sun and the wind. These storage devices are useful in matching a varying energy supply to a varying energy demand. Furthermore, possibilities are being sought that allow for energy storage in decentralized facilities for load equalization. In both cases lead storage batteries can be used. However, this type of cell has several disadvantages including relative expense, physical weight and a low energy density.

A new type of energy storage devices which can be used for the mentioned purposes is the hydrogen/bromine cell (see: "J. Electrochem. Soc.", vol. 127 (1980), pages 549 to 555). In this cell, the electrolysis of hydrobromic acid (HBr) is utilized for storing the electric energy:

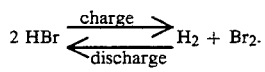

$$2\,HBr \underset{\text{discharge}}{\overset{\text{charge}}{\rightleftarrows}} H_2 + Br_2.$$

In the HBr electrolysis, hydrogen ($H_2$) and bromine ($Br_2$) are generated and are stored separately. When needed, they are converted again into hydrobromic acid in order to obtain electric energy, specifically, in a fuel cell reaction (see, for instance: "Energy", vol. 4 (1979), pages 61 to 66). The advantage of the hydrogen/bromine system as compared to other corresponding systems such as hydrogen/oxygen is the high reversibility of the bromine electrode.

In hydrogen/bromine cells known, graphite often is used as cell frame material. These cells however have the disadvantage that bromine diffuses through the cell frames.

SUMMARY OF THE INVENTION

It is, therefore, an object of this invention to provide a hydrogen/bromine cell which overcomes the aforementioned disadvantage of heretofore known cells and storage devices.

These and other objects are achieved by the invention which is directed to a hydrogen bromine cell and frame. The cell includes electrodes surrounded by a cell frame made of graphite which has a surface coating of pyrographite on at least the portion of the cell frame facing the bromine electrode. The pyrographite coating prevents diffusion of bromine through the cell frame. The cell made in this manner is light weight and inexpensive. The cell is designed such that both the fuel cell and the electrolysis reaction take place in the same location. A preferred embodiment has a pyrographite coating on the graphite cell frame portions which face both the bromine and the hydrogen electrodes of the cell.

BRIEF DESCRIPTION OF THE DRAWINGS

FIG. 1 is a representation of the preferred embodiment of the hydrogen/bromine cell of the instant invention.

DETAIL DESCRIPTION OF THE INVENTION

In accordance with the invention, a $H_2/Br_2$ cell is proposed that is corrosive resistant, light weight and inexpensive.

The corrosive materials found in $H_2/Br_2$ cells are specifically bromine and hydrobromic acid. Therefore, materials for construction of the cell frame, which could be considered for use, are inert plastics. Included in this group are plastics such as polytetrafluoroethylene (see: "Hydrogen Energy System", Proceedings of the 2nd World Hydrogen Energy Conference, Pergamon Press, 1978, pages 709 to 730). However, these materials are non-conductive, i.e., they have insulating properties, so that the current collection from and the current supply to the electrodes contained in a poly(perfluoroolefin) cell frame would present difficulties.

Of the electrically conductive materials, only noble metals such as palladium and platinum, as well as niobium and tantalum would be resistant to the aggressive chemical action of bromine and hydrobromic acid. These materials are expensive, however, and in addition are very heavy so that they have an adverse effect on the weight per stored power of the cells.

Graphite is readily used as material for $H_2/Br_2$ cells. This material is inexpensive and also electrically conductive. When using graphite as the cell frame material in $H_2/Br_2$ cells, however, it has been found that diffusion of bromine through the graphite takes place after only a short operating time due to the porosity of the material, i.e., bromine escapes through the cell frames. It now has been discovered that such diffusion through a graphite cell frame is prevented by use of a layer of pyrographite on the frame. The pyrographite, at the very least, is provided on the sections of the cell frame that face the bromine electrode.

The $H_2/Br_2$ cell according to the invention is absolutely $Br_2$ and HBr-tight, i.e., diffusion of these substances through the cell frame is completely prevented.

Further, the $H_2/Br_2$ cell according to the invention can be provided with a layer of pyrographite at the side of the cell frame facing the hydrogen electrode. Such a cell frame is absolutely $H_2$-tight and thereby prevents the escape of hydrogen. Furthermore, the escape of $Br_2$ and HBr can be prevented in this manner for the case when these substances are to pass through the diaphragm which separates the $Br_2$ from the $H_2$ electrode. However, if the use of different cell frames is tolerated, carbon impregnated with plastic, for instance, can be used on the $H_2$ side as the frame material in the cell according to the invention.

The layer of pyrographite disposed on the graphite cell frames has preferably a layer thickness of 20 to 30 microns. "Pyrographite" which is also called pyrolytic graphite, is understood here to mean a material which is obtained by pyrolytic decomposition of gaseous or vaporous hydrocarbons, such as methane, ethane, propane, and acetylene at temperatures above 1800° C. In contrast to the so-called pyrocarbon which is formed at lower temperatures (under 1700° C.) and is predominantly finely crystalline and isotropic, pyrographite is distinguished by a strongly anisotropic graphite-like layer structure.

Specifically referring to the drawing, the $H_2/Br_2$-cell 10 has a cell frame 11 on the $Br_2$ side and a cell frame 12 on the $H_2$ side. Both cell frames consist of graphite, where at the very least the surface of the frame facing the corresponding electrode is provided with a pyrographite layer; the graphite is preferably used in the form of electrographite. The cell frame 11 encloses the bromine electrode 13 and the cell frame 12 encloses the hydrogen electrode 14; both cell frames have a corresponding recess for this purpose. The surface of the recess in the cell frame 11 and that of the recess in the cell frame 12 are then coated with pyrographite.

The $Br_2$ electrode 13 consists preferably of a graphite felt which serves at the same time for making contact. The $H_2$ electrode 14 consists preferably of carbon covered with platinum. A graphite felt 15 provides the electrical contact between the $H_2$-electrode 14 and the cell frame 12. The two electrodes 13 and 14 are separated from each other by a diaphragm 16. The diaphragm 16 is a cation exchanger diaphragm, particularly of the perfluorinated polytetrafluoroethylene type.

For providing the reactants and reaction products to and from the cell, lines 17 and 18 on the $Br_2$-side and 19 and 20 on the $H_2$-side are provided. These lines pass through the cell frames 11 and 12 in the form of holes. Corresponding holes are found also in two metal plates 21 and 22, by which the two frames 11 and 12 are clamped together with for example insulated screws. The plates 21 and 22 consist, for instance, of stainless steel and function quasi as the two poles of the cell 10. These plates can be omitted, however, if the current is supplied or collected in some other manner. The electrolyte, i.e. the $HBr-Br_2$ mixture, is pumped in a closed circuit through the cell through its $HBr-Br_2$ part with for example a diaphragm pump.

The coating of the cell frames with pyrographite is accomplished, for instance, in such a manner that the cell frames, the surface of which is heated to a high temperature are fed a gaseous hydrocarbon. In the process, the hydrocarbon is thermally decomposed and the pyrographite is deposited on the surface of the cell frame as an anisotropic layer, with a high density and laminar structure. The deposition is carried out preferably under the following reaction conditions: temperature, 1900° C.; hydrocarbon, methane at a pressure of 5 mbar; the deposition rate is generally 0.5 to 0.8 microns/min.

The cell of the instant invention is illustrated by the following examples.

EXAMPLE I

A laboratory design of a cell according to the invention has, for instance, the following dimensions: the round metal plates have a diameter of 8.5 cm and a thickness of 8 mm; the cell frames each have a diameter of 5.7 cm and a thickness of about 2 cm. The $H_2$ electrode contains approximately 2.5 to 5 mg $Pt/cm^2$ and has an active area of 12.5 $cm^2$.

EXAMPLE II

The cell of example I can serve in a simple manner for constructing batteries, in which the individual cells are connected electrically in series. For this purpose, cell frames are used which are provided with recesses on both sides. Here, a bromine electrode would then be arranged, for instance, in the second recess of the cell frame 12 and a further diaphragm which would then be followed by a hydrogen electrode, omitting the plate 22. On the $Br_2$ side the situation would accordingly be reversed. The feed and discharge lines, however, must take a different path in this case.

EXAMPLE III

A $H_2/Br_2$ cell having the same properties as the cell in Examples I or II can be used in the electrolysis reaction. For example a cell starting out with 6MHBr which is reduced to 1MHBr during the electrolysis reaction (i.e., storing energy). For storing 1 kWh, 13.4 l 6-MHBr are then required (voltage: 560 mV). In the fuel cell reaction, the 1-MHBr is then concentrated again to 6-MHBr. An $H_2$ demand of about 500 l /kWh is the result. However, the cell according to the invention can also be operated in such a manner that for the electrolysis, an electrolyte with a starting concentration of 3.65MHBr and 0.1M$Br_2$, and for the fuel cell reaction an electrolyte with a starting concentration of 1.65MHBr and 1.3M$Br_2$ are used (temperature: 50° C.).

In the foregoing specification, the invention has been described with reference to specific exemplary embodiments thereof. It will, however, be evident that various modifications and changes may be made thereunto without departing from the broader spirit and scope of the invention as set forth in the appended claims. The specifications and drawings are, therefore, to be considered as illustrative rather than restrictive.

What is claimed is:

1. A hydrogen/bromine cell for storing and producing electricity comprising: two cell frame halves made of graphite, each half having a face surface with a recess and a back surfaces, and, the face surface of the cell frame halves being positioned so as to face each other;

an electrode mounted inside each recess, one electrode being a bromine electrode and the other being a hydrogen electrode;

a nonporous pyrographite layer covering at least the surface of the recess of the cell frame half surrounding the bromine electrode;

a cation exchanger diaphragm mounted between the two cell frame halves, said diaphragm separating the two electrodes from each other;

said cell frame halves further defining a plurality of tubular holes from said recesses to the outside of said cell for providing reactants and reaction products to and from the cell;

a clamping means for holding the cell together, positioned adjacent the frame back surfaces;

means for supplying electrical current to the cell and collecting electrical current from the cell.

2. A hydrogen/bromine cell according to claim 1 wherein at least the surface of the recess of the cell frame half surrounding the hydrogen electrode is covered with a nonporous pyrographite layer.

3. A hydrogen/bromine cell according to claim 2 wherein the pyrographite layer has a layer thickness of about 20 to about 30 $\mu m$.

4. A hydrogen/bromine cell according to claim 2 wherein the pyrographite layer is produced by pyrolytic decomposition of a gaseous or vaporous hydrocarbon, at a temperature above 1800° C.

5. A hydrogen/bromine cell according to claim 2 wherein the pyrographite layer comprises an anisotropic graphite-like layer structure.

6. A hydrogen/bromine cell according to claim 1 wherein the pyrographite layer has a layer thickness of about 20 to about 30 $\mu m$.

7. A hydrogen/bromine cell according to claim 1 wherein the bromine electrode is electrically conducting carbon.

8. A hydrogen/bromine cell according to claim 7 wherein the carbon is graphite.

9. A hydrogen/bromine cell according to claim 1 wherein the hydrogen electrode is carbon covered with platinum.

10. A hydrogen/bromine cell according to claim 1 wherein the cation exchanger diaphragm is formed from a poly(perfluoroolefin).

11. A hydrogen/bromine cell according to claim 10 wherein the diaphragm is formed from poly(tetrafluoroethylene).

12. A hydrogen/bromine cell according to claim 1 wherein the pyrographite layer is produced by pyrolytic decomposition of a gaseous or vaporous hydrocarbon, at a temperature above 1800° C.

13. A hydrogen/bromine cell according to claim 1 wherein the pyrographite layer comprises an anisotropic graphite-like layer structure.

* * * * *